Dec. 6, 1938.  J. A. DE CEW  2,138,840
PREPARATION OF ALUM SOLUTIONS FOR PAPER SIZING
Filed July 12, 1934
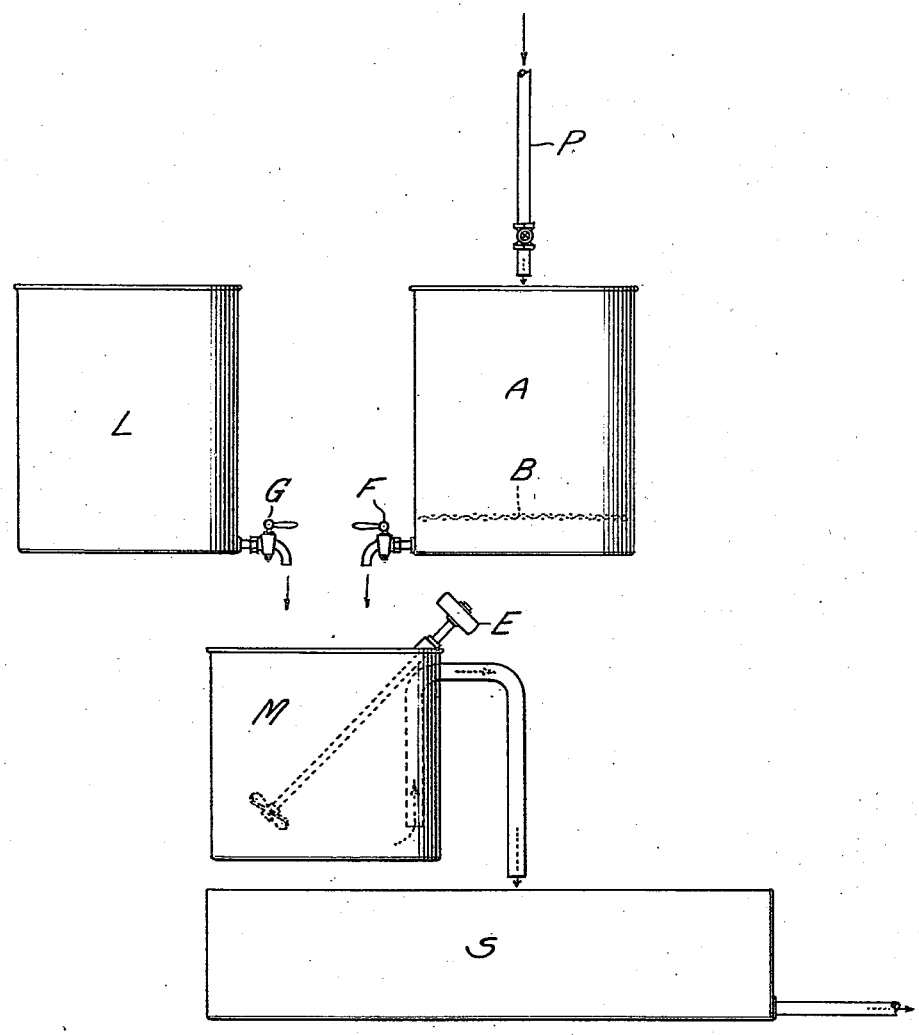
INVENTOR.
JUDSON A. DE CEW,
BY Arthur Middleton
ATTORNEY.

Patented Dec. 6, 1938

2,138,840

UNITED STATES PATENT OFFICE 2,138,840

PREPARATION OF ALUM SOLUTION FOR PAPER SIZING

Judson A. De Cew, Mt. Vernon, N. Y.

Application July 12, 1934, Serial No. 734,712

1 Claim. (Cl. 92—21)

The invention relates to an alum solution having a higher alumina concentration and a less hydrogen ion concentration than is possible to obtain unless special modes of preparation are followed and according to the present invention the alum solution having the higher alumina concentration also less hydrogen ion concentration preferably has a pH value that is within the range of 3.8 and approximately 4.2.

The alum solution which is the basis of this present invention has particular usefulness for the sizing of paper and is employed during the manufacture of the paper.

Sulphate of alumina is one of the chemical materials used in paper sizing. It is generally considered that the chief function of this material is to precipitate a sizing composition containing resinate of soda, but I have discovered another important function that is dependent upon the physico-chemical properties of the alum solution itself. I have devised a method of preparing such a solution within the paper mill where the solution is used, employing commercial sulphate of alumina, the trade name of which is "Alum".

Pure, anhydrous sulphate of alumina contains 30% $Al_2O_3$ and 70% $SO_3$. Commercial alum is sold in a solid form, containing approximately 76% of anhydrous sulphate of alumina.

The percentage of alumina, $Al_2O_3$ to the acid $SO_3$ is about the same as the above theoretical proportions but sometimes it contains slightly more than the 70% of $SO_3$ and the excess above this amount is called "free acid".

When the percentage of $Al_2O_3$ is above 30%, the excess is called "basic alumina" but these materials are actually combined and not free. An analysis of commercial alums may show as much as .5% of excess $SO_3$ or as much as 3% excess $Al_2O_3$, calculated on the weight of anhydrous alum or about 2% calculated on the weight of commercial alum.

If a commercial alum is made containing more than 2% of excess alumina, it is difficult to dissolve from the solid condition in which it is sold to the trade and therefore, it is not commercially feasible to make it more basic for use in paper making under the conditions in which it is now marketed.

Altho alumina ($Al_2O_3$) is a weak base, and there is a tendency towards hydrolytic disassociation in the aqueous solution of sulphate of alumina, nevertheless, the concentration of the hydrogen ions in all commercial alums is such that they can be put into a dilute solution without the precipitation of alumina, this being the aim and purpose of the alum makers, where solubility and the precipitating power of the acid radical, $SO_3$, are considered to be the important requirements of this material.

The purpose of this invention is to convert a commercial alum as above described into an alum solution more suitable for paper making and especially with reference to sizing, in which the concentration of the hydrogen ions is depressed and the concentration of the aluminium ions is increased to form a truly basic solution of sulphate of alumina that will react chemically with the paper making fibers and the rosin size.

A cellulose fibre will absorb basic sulphate of alumina from such an alum solution and the amount of adsorption depends upon the concentration of the aluminium ions at the temperature and degree of dilution of the alum solution.

Most commercial alums, when put into solution, will have a pH of from 3 to 3.6 and a cellulose fibre will adsorb very little alumina from such a solution. If it does adsorb any of the alumina, the concentration of the hydrogen ions is increased and the adsorption ceases.

Cellulose fibre will also absorb $SO_3$ from an alum solution and this acid radical becomes so permanently fixed by the cellulose that it cannot be later removed by any reverse treatment that is possible in the sizing process. The adsorption of this acid is what eventually converts the paper making fibre into hydro-cellulose and destroys the permanency of the paper made therefrom.

Therefore, one of the most important functions of the alum solution is its capacity to deliver basic sulphate of alumina to a cellulose fibre by adsorption. The physico-chemical reaction is entirely distinct from mixing of colloidal alumina with cellulose fibres where it acts more as a filling material and is not adsorbed by the fibres as it would be if the fibres were immersed in a really basic sulphate of alumina.

Paper making fibres that have adsorbed sulphate of alumina from an alum solution can react with a sizing solution containing sodium resinate and produce an excellent sizing effect in the finished paper whereas fibres that have only adsorbed the acid radical $SO_3$ may be able to precipitate resin from resinate of soda but with little or no sizing effect in the finished paper, as a true resinate of alumina is not formed.

I have now discovered methods of treating the alum solution by which the concentration of the aluminium ions is increased so that the alum solution may contain more alumina.

As the concentration of the aluminium ions in an alum solution is increased, the pH of the solution rises. This increase in pH is a means of measuring the degree to which this process is being carried out. Commercial alums have a pH in 10% solution of between 3 and 3.6. With my process, the pH of these solutions can be raised to from 3.8 to 4.2. This result however, depends upon the method used in adding the alkali to the alum solution.

If the alkali is put into a fairly dilute solution or suspension in water and the alum solution is fairly concentrated and the alkaline solution is added to the alum solution while a rapid mixing action is taking place, then it is possible to dissolve the alkali in the alum solution without the precipitation of alumina and then the pH of the solution rises as the alkali reacts with the $SO_3$ of the solution.

All of these conditions have an influence upon the success with which the process can be carried out to produce a high concentration of alumina. The solution must remain, however, a basic solution of sulphate of alumina.

I will now describe one method of producing this special kind of alum solution. Reference is made to the sole figure of the accompanying drawing that constitutes a part of this specification.

Ordinary commercial alum, preferably in the form of lumps or cakes, is placed in the dissolving tank, A, in which there is a false, screen, or pervious bottom B thru which the alum solution can flow or pass. A stream of either hot or cold water is poured or sprayed by pipe P over the alum and the dissolved alum flows from this tank thru the discharge pipe or faucet F into the mixing tank M.

An alkali either in the form of a lime, magnesia or soda or the carbonates of same is made into a solution or rendered in suspension in water in the tank L and this alkaline solution flows thru the pipe or faucet G into the mixing tank M. The alum solution is kept fairly concentrated, preferably over 10% and the alkaline solution as made and employed is fairly weak.

These solutions are rapidly mixed together by an agitator E as while they are flowing continuously into the tank M and the alkali reacts with the $SO_3$ of the alum solution without the precipitation of the alumina.

Under the conditions and concentration above described, if there is any precipitation of alumina, it is quickly redissolved by the $SO_3$ in the alum solution. From the mixer M the alum solution flows to storage tank S.

It is practicable to use around 6 parts sodium carbonate or three (3) parts of lime to 100 parts of commercial alum, but more of these materials can be dissolved in the alum if desired before colloidal alumina is produced.

I. According to one illustrative example, 10 parts of commercial sulphate of alumina is dissolved in 100 parts of water, thus resulting in what may be referred to as "normal" alum solution having a pH of 3; this solution is treated with 6 parts of sodium carbonate in solution, the alkali being stirred in rapidly and the stirring is accompanied by the effervescence of the $CO_2$ gas, which also produces or furthers agitation, or in other words, aids the intimate mixing; under these conditions the specified amount of soda or alkaline solution is all added without consequent precipitation and production of colloidal alumina; also under the procedure specified, the pH of the solution will be raised above that of the normal alum solution, for instance to 3.8 or even substantially above 3.8, but not above 4.2. Above this point colloidal alumina is produced. It will, therefore, be seen that the chemical character of the specially treated alum solution, as thus outlined, is greatly altered as compared with the normal alum solution produced by the direct dissolving of 10 parts of alum in 100 parts of water and in which the pH of the normal solution will be or would be somewhere between 3 and 3.6, but not over. By way of further illustration, an alum solution having a pH of 3.8 when treated with 6% of sodium carbonate ($Na_2CO_3$) or 3% of calcium oxide (CaO) and accompanied by the intimate mixing can be caused to have the pH increased to 4.2 or higher, but if a more acid alum is treated, much higher proportions of lime and soda ash must be used.

As this invention consists primarily in the production of an alum solution from commercial alum which will deposit a more basic sulphate of alumina in the fibres by adsorption than will commercial alum as it is known today, it is deemed advisable to describe or indicate an alternative method or methods of producing such a solution.

Instead of adding an alkali such as above described, a salt of an alkali and a weak organic acid may be used such as sodium or calcium acetate. The weak base, namely, the alumina base, and the strong acid content, namely, the sulphuric acid or the sulphate ions produces a salt having a pH of from 3 to 3.6. A strong base as soda and a weak acid as acetic produces a salt, namely, sodium acetate, with a pH of 5.6. The same result may be obtained by adding a solution of aluminium acetate to the alum solution.

In order, therefore, to obtain an alum solution of the desired basicity, namely, between 3.8 pH and 4.2 pH, it is only necessary to add a sufficient amount of the salt or solutions of sodium acetate or aluminum acetate to the alum solution to depress the hydrion, raising the pH to within the limits specified.

A solution of basic aluminum acetate has a pH of 5.6, the same as sodium acetate.

Regardless of how the pH of the alum solution is raised, whether by the addition of an alkali or a salt of an organic acid, which has a higher pH than the alum solution, the basic element of this invention is the production of a solution for paper sizing which consists substantially of sulphate of alumina and that this solution has a pH of between 3.8 and 4.2.

If the pH is raised to a point where the sulphate of alumina has lost its acid reaction, then it would be no longer a solution of sulphate of alumina and would lack the acidity required for proper sizing reaction.

What is claimed is:—

A process of making a true solution of sulphate of alumina for paper sizing having a pH of from between 3.8 and 4.2 which comprises the addition to an aqueous solution of commercial sulphate of alumina of an aqueous solution of a member of the group consisting of lime, magnesia, soda, the carbonates thereof, and the acetates thereof.

JUDSON A. DE CEW.